United States Patent
Anderson

(10) Patent No.: US 10,538,634 B2
(45) Date of Patent: Jan. 21, 2020

(54) RESIN-SUPPORT EMULSION POLYMERIZATION OF HYDROPHOBIC MONOMERS

(71) Applicant: BASF SE, Ludwigshafen (DE)

(72) Inventor: Jeffrey L. Anderson, Eveleth, MN (US)

(73) Assignee: BASF SE, Ludwigshafen (DE)

( * ) Notice: Subject to any disclaimer, the term of this patent is extended or adjusted under 35 U.S.C. 154(b) by 235 days.

(21) Appl. No.: 15/115,343

(22) PCT Filed: Jan. 30, 2015

(86) PCT No.: PCT/US2015/013730
§ 371 (c)(1),
(2) Date: Jul. 29, 2016

(87) PCT Pub. No.: WO2015/116916
PCT Pub. Date: Aug. 6, 2015

(65) Prior Publication Data
US 2017/0166706 A1    Jun. 15, 2017

Related U.S. Application Data

(60) Provisional application No. 61/933,456, filed on Jan. 30, 2014.

(51) Int. Cl.
| | | |
|---|---|---|
| C08J 3/07 | (2006.01) |
| C09D 125/14 | (2006.01) |
| C09D 133/08 | (2006.01) |
| C08L 25/14 | (2006.01) |
| C08L 33/08 | (2006.01) |

(52) U.S. Cl.
CPC ............ *C08J 3/07* (2013.01); *C08L 25/14* (2013.01); *C08L 33/08* (2013.01); *C09D 125/14* (2013.01); *C09D 133/08* (2013.01)

(58) Field of Classification Search
CPC .............. C08J 3/07; C08F 257/02; C08L 25/14; C08L 33/08; C09D 125/14; C09D 133/08
See application file for complete search history.

(56) References Cited

U.S. PATENT DOCUMENTS

| | | |
|---|---|---|
| 4,151,143 A | 4/1979 | Blank et al. |
| 4,565,839 A | 1/1986 | Nakayama |
| 4,839,413 A | 6/1989 | Kiehlbauch et al. |
| 6,316,538 B1 | 11/2001 | Anderson et al. |
| 2012/0136109 A1 | 5/2012 | Pafford et al. |

FOREIGN PATENT DOCUMENTS

| | | |
|---|---|---|
| JP | S56-109201 A | 8/1981 |
| JP | S5695915 A | 8/1981 |
| JP | H09-309906 A | 12/1997 |

OTHER PUBLICATIONS

International Search Report and Written Opinion dated Apr. 24, 2015 for International Application No. PCT/US2015/013730 (15 pages).

Notification of Reasons for Refusal in JP Application No. 2016-549353, dated Dec. 10, 2018 (English translation—6 pages).

*Primary Examiner* — John E Uselding
(74) *Attorney, Agent, or Firm* — Foley & Lardner LLP

(57) ABSTRACT

Composition and methods of making the compositions are provided. The composition may include an aqueous emulsion of a polymer resin and a hydrophobic monomer with the proviso that the composition is surfactant-free; wherein the support resin may be a styrene-acrylic resin or acrylic resin having from about 5 wt % to about 40 wt % acid functional repeat units.

18 Claims, No Drawings

RESIN-SUPPORT EMULSION POLYMERIZATION OF HYDROPHOBIC MONOMERS

CROSS-REFERENCE TO RELATED APPLICATIONS

This application is the U.S. national phase application under 35 U.S.C. § 371 of International Application No. PCT/US2015/013730, filed Jan. 30, 2015, which claims the benefit of U.S. Provisional Patent Application No. 61/933,456, filed on Jan. 30, 2014, which are incorporated herein by reference in their entireties, for any and all purposes.

FIELD

The present technology generally relates to emulsion polymerization of hydrophobic monomers.

SUMMARY

In one aspect, a composition is provided including an aqueous emulsion of a polymer resin and a hydrophobic monomer, with the proviso that the composition is surfactant-free, and where the support resin is a styrene-acrylic resin or acrylic resin having from about 5 wt % to about 40 wt % acid functional repeat units. The hydrophobic monomer may include a $C_4$-$C_{40}$ alkylacrylate, a $C_4$-$C_{40}$ alkylmethacrylate, a $C_4$-$C_{40}$ alkenylacrylate, or a $C_4$-$C_{40}$ alkenylmethacrylate, or a mixture of any two or more thereof. In one embodiment, the hydrophobic monomer includes lauryl acrylate, stearyl acrylate, behenyl acrylate or a mixture of any two or more such hydrophobic monomers. In any of the embodiments of the composition, the polymer may be a homopolymer of lauryl acrylate, or a homopolymer of stearyl acrylate. In any of the embodiments of the composition, the aqueous emulsion may be a nanoemulsion having an average particle size of from about 10 nm to about 500 nm. In any of the embodiments of the composition, the aqueous emulsion may be a nanoemulsion having an average particle size of from about 25 nm to about 250 nm. In any of the embodiments of the composition, the aqueous emulsion may be a nanoemulsion having an average particle size of from about 50 nm to about 150 nm.

In another aspect, a process is provided for forming a nanoemulsion. Such processes may include polymerizing in a reactor a hydrophobic monomer in aqueous media, in the presence of a support resin, without the presence of a surfactant, to form the nanoemulsion of a polymer of the hydrophobic monomer, where the support resin is a styrene-acrylic resin or acrylic resin having from about 5 wt % to about 40 wt % acid functional repeat units. The process may also include dispersing the support resin in water in the reactor, adding to the reactor the hydrophobic monomer, and sequentially adding to the reactor a reducing agent and an oxidizing agent. In any of the embodiments of the process, the adding the hydrophobic monomer includes melting the hydrophobic monomer prior to adding to the reactor.

DETAILED DESCRIPTION

The illustrative embodiments described herein and in the claims are not meant to be limiting. Other embodiments may be utilized, and other changes may be made, without departing from the spirit or scope of the subject matter presented here. The present technology is also illustrated by the examples herein, which should not be construed as limiting in any way.

As used herein, the following definitions of terms shall apply unless otherwise indicated.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Alkyl groups include straight chain and branched alkyl groups having from 4 to 40 carbon atoms or, in some embodiments, from 4 to 34, 6 to 40, 6 to 24, or 8 to 40 carbon atoms.

Alkenyl groups include straight and branched chain and cycloalkyl groups as defined above, except that at least one double bond exists between two carbon atoms.

The term "alkylacrylate" refers to a compound of formula $ROC(O)CH=CH_2$, where R is an alkyl group. R may be a $C_4$-$C_{40}$ alkyl group. In some embodiments, R is a $C_8$-$C_{34}$ alkyl group.

The term "alkylmethacrylate" refers to a compound of formula $ROC(O)C(CH_3)=CH_2$, where R is an alkyl group. R may be a $C_4$-$C_{40}$ alkyl group. In some embodiments, R is a $C_8$-$C_{34}$ alkyl group.

The term "alkenylacrylate" refers to a compound of formula $R^2OC(O)CH=CH_2$, where $R^2$ is an alkenyl group. $R^2$ may be a $C_4$-$C_{40}$ alkenyl group. In some embodiments, R is a $C_8$-$C_{34}$ alkenyl group.

The term "alkenylmethacrylate" refers to a compound of formula $R^2OC(O)C(CH_3)=CH_2$, where $R^2$ is an alkenyl group. $R^2$ may be a $C_4$-$C_{40}$ alkenyl group. In some embodiments, R is a $C_8$-$C_{34}$ alkenyl group.

Monomers having a highly hydrophobic chains provide for useful polymers. However, such monomers are not readily amenable to use in low-volatility organic compound coating compositions, or in non-volatile organic compound (VOC), coating compositions, because they have not been amenable to aqueous emulsification. In order to prepare emulsions of such hydrophobic monomers, excessive amounts of surfactants are required and/or very high mixing speeds are used to ensure small particle emulsions. The present inventors have found new emulsion polymers that are highly lipophilic (i.e. hydrophobic) and which have side chains that tend to crystallize. The new emulsion polymers utilize a support resin to form the polymer of the hydrophobic monomer, without the necessity of surfactants or high-speed mixing.

Accordingly, in one aspect, an aqueous composition is provided. The composition contains a support resin and an aqueous emulsion of a polymer of a hydrophobic monomer, provided the aqueous composition is surfactant-free, where the support resin is a styrene-acrylic or acrylic resin having from about 5 wt % to about 40 wt % acid functional repeat units. As used herein, the term "surfactant-free" is intended to mean that the polymerization was conducted without the use of a surfactant, and no surfactant was added to the composition at any time prior to, or during, formation of the emulsion and composition. For example, the polymerization process or the compositions are free of surfactants such as non-ionic surfactants or ionic surfactants. Such aqueous compositions may also be prepared without resorting to high-speed mixing. As used herein, "high-speed mixing" refers to emulsification where mixing speeds above normal mixing speeds are used.

The hydrophobic monomer of the aqueous compositions may be a monomeric unit having a hydrophobic side chain. For example, the hydrophobic monomer may be an acrylate or methacrylate monomer with a hydrophobic side chain. For example, the hydrophobic monomer may be a $C_4$-$C_{40}$ alkylacrylate, a $C_4$-$C_{40}$ alkylmethacrylate, a $C_4$-$C_{40}$ alkenylacrylate, a $C_4$-$C_{40}$ alkenylmethacrylate, or a mixture of any two or more such hydrophobic monomers. In some embodiments, the monomer is a $C_8$-$C_{34}$ alkylacrylate or $C_8$-$C_{40}$ alkenylacrylate. In some embodiments, the monomer is a $C_8$-$C_{34}$ alkylacrylate or $C_8$-$C_{34}$ alkylmethacrylate. Illustrative hydrophobic monomers include, but are not limited to, capryl acrylate, pelargonyl acrylate, undecyl acrylate, lauryl acrylate, tridecyl acrylate, myristyl acrylate, pentadecyl acrylate, cetyl acrylate, palmitoleyl acrylate, heptadecyl acrylate, stearyl acrylate, isostearyl acrylate, elaidyl acrylate, linoleyl acrylate, elaidolinolenyl acrylate, nondecyl acrylate, arachidyl acrylate, heneiscosyl acrylate, behenyl acrylate, erycyl acrylate, lignoceryl acrylate, ceryl acrylate, heptacosanyl acrylate, montanyl acrylate, docosanyl acrylate, myricyl acrylate, dotriacontanyl acrylate, geddyl acrylate, capryl methacrylate, pelargonyl methacrylate, undecyl methacrylate, lauryl methacrylate, tridecyl methacrylate, myristyl methacrylate, pentadecyl methacrylate, cetyl methacrylate, palmitoleyl methacrylate, heptadecyl methacrylate, stearyl methacrylate, isostearyl methacrylate, elaidyl methacrylate, linoleyl methacrylate, elaidolinolenyl methacrylate, nondecyl methacrylate, arachidyl methacrylate, heneiscosyl methacrylate, behenyl methacrylate, erycyl methacrylate, lignoceryl methacrylate, ceryl methacrylate, heptacosanyl methacrylate, montanyl methacrylate, nancosanyl methacrylate, myricyl methacrylate, dotriacontanyl methacrylate, and geddyl methacrylate. If a co-polymer is desired, mixtures of any two more such hydrophobic monomers may be employed. In some embodiments, the hydrophobic monomer is lauryl acrylate, stearyl acrylate, behenyl acrylate, or a mixture of any two or more.

The polymer of the hydrophobic monomer may be a homopolymer. Accordingly, in some embodiments, the hydrophobic monomer is exclusively any of the above hydrophobic monomers. In some embodiments, the polymer is a homopolymer of lauryl acrylate, a homopolymer of stearyl acrylate, or a homopolymer of behenyl acrylate.

In other embodiments, the polymer of the hydrophobic monomer may be a co-polymer. Accordingly, in some embodiments, the hydrophobic monomer is a mixture of any two or more of the above hydrophobic monomers. In some embodiments, the polymer is a co-polymer of lauryl acrylate and stearyl acrylate.

The support resin may be a styrene-acrylic resin or an all-acrylic resin. Such support resins may be produced by solution polymerization or high temperature continuous polymerization. In some embodiments, the support resins have from about 5 wt % to about 25 wt % carboxylic acid functionality imparted by acid functional monomer, or repeat, units. The acid functionality is believed to provide stabilization of the emulsified monomers and polymers.

It is helpful to have support resin hydrophobic monomers as part of this composition, or one may post-modify the resin with hydrophobic graft monomers after the resin is dispersed in water. For example, support resin hydrophobic monomers may be included in the support resin to provide hydrophobic properties, or the support resin may be post-modified with a support resin hydrophobic monomer. As used with respect to the support resin hydrophobic monomers in the support resin, such monomers may have $C_4$ to $C_{20}$ alkyl groups to impart the hydrophobic character. Illustrative support resin hydrophobic groups include, but are not limited to lauryl, stearyl, behenyl, and cetyl. Such groups, for example may be imparted by incorporation of a support resin hydrophobic monomer in the preparation support resin. Such monomers include, but are not limited to, stearyl acrylate, lauryl acrylate, or behenyl acrylate. Where the resin is post-modified it may be through reaction of a glycidyl-containing monomer with the acid functional support resin. Illustrative glycidyl monomers include, but are not limited to, lauryl glycidyl ether and stearyl glycidyl ether. The support resin may include both incorporated hydrophobic monomers and it may be post-modified with hydrophobic groups.

The support resin may have from about 1 wt % to about 15 wt % support resin hydrophobic monomer content. In some embodiments, the support resin may have from about 1 wt % to about 10 wt % support resin hydrophobic monomer content. In some embodiments, the support resin may have from about 1 wt % to about 5 wt % support resin hydrophobic monomer content. The weight average molecular weight of the support resin may be from about 5,000 g/mol to about 20,000 g/mol.

The aqueous emulsion may be a micro-emulsion with micron-sized or sub-micron-sized emulsified particles of the polymer. In some embodiments, the aqueous emulsion is a nanoemulsion. For example, the emulsified particles may have an average particle size of from about 1 nm to about 10 microns. In some embodiment, the emulsified particles have an average particle size of from about 10 nm to about 1 micron. In some embodiments, the emulsified particles have an average particle size of from about 10 nm to about 500 nm. In some embodiments, the emulsified particles have an average particle size of from about 25 nm to about 250 nm. In some embodiments, the emulsified particles have an average particle size of from about 50 nm to about 150 nm.

Overall, the process of forming the polymers is a redox process. Accordingly, and as further described below, the aqueous emulsion may include oxidants and/or reductants, or reaction products of oxidants and reductants. Oxidant(s) are present in the emulsions for the catalyzation of the polymerization of the hydrophobic monomer. Illustrative oxidants include peroxides. For example, the oxidant may include, but is not limited to, di-tert-amyl peroxide (DTAP); tert-amylhydroperoxide (TARP), tert-butylhydroperoxide (TBHP); di-tert-butylperoxide (DTBP); lauryl peroxide; dilauryl peroxide (DLP), succinic acid peroxide; or benzoyl peroxide. Accordingly, such oxidants, or their breakdown products after reaction may be present in the emulsions. The reductants, assisted by a metal ion, break down the oxidant to produce the free radicals for polymerization of the hydrophobic monomers inside the emulsified droplets. Illustrative reductants include, but are not limited to, salts of ascorbic acid or isoascorbic acid, sodium formaldehyde sulfoxylate, and sodium bisulfate. Illustrative salts of ascorbic acid and isoascorbic acid include, but not limited to, lithium ascorbate, sodium ascorbate, potassium ascorbate, calcium ascorbate, magnesium ascorbate, ammonium ascorbate, alkylammonium ascorbates, lithium isoascorbate, sodium isoascorbate, potassium isoascorbate, calcium isoascorbate, magnesium isoascorbate, ammonium isoascorbate, and alkylammonium isoascorbates. Accordingly, such reductants, or their breakdown products after reaction may be present in the emulsions. For example, where the aqueous emulsion is neutralized, the reaction product of the reductant may be an acid such as ascorbic acid or isoascorbic acid. Finally, the metal ions include, but are not limited to, metals such as iron, nickel, copper, silver, and gold. In some embodiments, the metal ion is copper or iron.

The solids in the aqueous emulsions may be from about 15 wt % to about 35 wt % support resin and from about 65 wt % to about 85 wt % hydrophobic monomer, with trace levels of reductants and/or oxidants or their reaction residues. For example, the solids may contain from 0.10 to 0.50 wt % oxidant or a reaction product of the oxidant and/or from 0.10 to 0.50 wt % reductant or a reaction product of the reductant. In some embodiments, the oxidant is tert-butylhydroperoxide and the reductant is ammonium isoascorbate. Further, the solids may contain a salt of the metal ion, or a residue thereof.

In another aspect, a process is provided for preparing the above aqueous emulsions. The process includes polymerizing in a reactor a hydrophobic monomer in aqueous media, in the presence of a support resin, to form a microemulsion of a polymer of the hydrophobic monomer. The process is conducted without employing a surfactant. The process is also conducted without the use of high-speed mixing in the reactor. The support resin may be prepared immediately prior to the addition of the formation of the microemulsion of the polymer of the hydrophobic monomer.

After addition of the hydrophobic monomer to the support resin, a mixing time may be employed. The mixing time may be used to obtain a homogeneous mixture prior to the addition of a reductant, and subsequent addition of an oxidant. The mixing time may be from about 1 minute to about 5 hours. In some embodiments, the mixing time is from about 15 minutes to about 2 hours. In yet other embodiments, the mixing time is from about 30 minutes to about 1 hour.

As introduced above, the process may include addition of a reductant to the hydrophobic monomer and the support resin. The reductant works with a metal ion to break down the peroxide and produce the free radicals for polymerization of the hydrophobic monomers inside the emulsified droplets. Illustrative reductants include, but are not limited to, salts of ascorbic acid or isoascorbic acid, sodium formaldehyde sulfoxylate, and sodium bisulfate. Illustrative salts of ascorbic acid and isoascorbic acid include, but not limited to, lithium ascorbate, sodium ascorbate, potassium ascorbate, calcium ascorbate, magnesium ascorbate, ammonium ascorbate, alkylammonium ascorbates, lithium isoascorbate, sodium isoascorbate, potassium isoascorbate, calcium isoascorbate, magnesium isoascorbate, ammonium isoascorbate, and alkylammonium isoascorbates. Illustrative metal ions include, but are not limited to, metals such as iron, nickel, copper, silver, and gold. In some embodiments, the metal ion is copper or iron.

As introduced above, the process may include addition of a oxidant to the hydrophobic monomer and the support resin. The oxidant catalyzes the polymerization of the hydrophobic monomer. Illustrative oxidants include peroxides. For example, the oxidant may include, but is not limited to, di-tert-amyl peroxide (DTAP); tert-amylhydroperoxide (TAHP), tert-butylhydroperoxide (TBHP); di-tert-butylperoxide (DTBP); lauryl peroxide; dilauryl peroxide (DLP), succinic acid peroxide; or benzoyl peroxide. In some embodiments, the adding of the oxidant follows the addition of the reductant, to polymerize the monomers.

The support resin may be a styrene-acrylic resin or an all-acrylic resin. Such support resins may be produced by solution polymerization or high temperature continuous polymerization. In some embodiments, the support resins have from about 5 wt % to about 25 wt % carboxylic acid functionality imparted by acid functional monomer, or repeat, units. The acid functionality is believed to provide stabilization of the emulsified monomers and polymers.

As noted it is helpful to have support resin hydrophobic monomers as part of this composition, or one may post-modify the resin with hydrophobic graft monomers after the resin is dispersed in water. For example, support resin hydrophobic monomers may be included in the support resin to provide hydrophobic properties, or the support resin may be post-modified with a hydrophobic monomer. As used with respect to the support resin hydrophobic monomers in the support resin, such monomers may have $C_4$ to $C_{20}$ alkyl groups to impart the hydrophobic character. Illustrative hydrophobic groups include, but are not limited to lauryl, stearyl, behenyl, and cetyl. Such groups, for example may be imparted by incorporation of a hydrophobic monomer in the preparation support resin. Such monomers include, but are not limited to, stearyl acrylate, lauryl acrylate, or behenyl acrylate. Where the resin is post-modified it may be through reaction of a glycidyl containing monomer with the acid functional support resin. Illustrative glycidyl monomers include, but are not limited to, lauryl glycidyl ether and stearyl glycidyl ether. The support resin may include both incorporated hydrophobic monomers and be post-modified with hydrophobic groups.

The support resin may have from about 1 wt % to about 15 wt % support resin hydrophobic monomer content. In some embodiments, the support resin may have from about 1 wt % to about 10 wt % support resin hydrophobic monomer content. In some embodiments, the support resin may have from about 1 wt % to about 5 wt % support resin hydrophobic monomer content. The weight average molecular weight of the support resin may be from about 5,000 g/mol to about 20,000 g/mol.

In the process, the polymerizing may also include dispersing the support resin in water in the reactor, adding to the reactor the hydrophobic monomer, and adding to the reactor a reductant (reducing agent) and an oxidant (oxidizing agent). The solids in the resulting dispersion may be from about 15 wt % to about 35 wt % support resin, from about 65 wt % to about 85 wt % hydrophobic monomer, and with trace levels of reductant and/or oxidant. For example, the solids may contain from about 0.10 wt % to about 0.50 wt % oxidant or a reaction product of the oxidant and/or from about 0.10 wt % to about 0.50 wt % reductant or a reaction product of the reductant. In some embodiments, the oxidant is tert-butylhydroperoxide and the reductant is ammonium isoascorbate. In some embodiments, in addition to the resin and hydrophobic monomer the solids of the dispersion may contain about 0.35 wt % tBHP and about 0.25 wt % ammonium isoascorbate, or reaction by-products thereof, such as isoascorbic acid.

In the process, where the hydrophobic monomer is a solid or semi-solid at room temperature, or at the ambient temperature at the site of reaction, the hydrophobic monomer may be melted prior to adding to the reactor. Melting of the hydrophobic monomer provides for a fluid addition to the reactor and fine dispersion into the support resin during emulsification and polymerization.

In the process, the hydrophobic monomer may be a monomeric unit having a hydrophobic side chain. For example, the hydrophobic monomer may be an acrylate monomer with a hydrophobic side chain. For example, the hydrophobic monomer may be a $C_4$-$C_{40}$ alkylacrylate or a $C_4$-$C_{40}$ alkylmethacrylate, $C_4$-$C_{40}$ alkenylacrylate or a $C_4$-$C_{40}$ alkenylmethacrylate, or a mixture of any two or more such hydrophobic monomers. In some embodiments, the monomer is a $C_8$-$C_{34}$ alkylacrylate or $C_8$-$C_{40}$ alkenylacrylate. In some embodiments, the monomer is a $C_8$-$C_{34}$ alkylacrylate or $C_8$-$C_{34}$ alkylmethacrylate. Such illustrative hydrophobic monomers include, but are not limited to, capryl acrylate, capryl acrylate, pelargonyl acrylate, undecyl acrylate, lauryl acrylate, tridecyl acrylate, myristyl acrylate, pentadecyl acrylate, cetyl acrylate, palmitoleyl acrylate, heptadecyl acrylate, stearyl acrylate, isostearyl acrylate, elaidyl acrylate, linoleyl acrylate, elaidolinolenyl acrylate, nondecyl acrylate, arachidyl acrylate, heneiscosyl acrylate, behenyl acrylate, erycyl acrylate, lignoceryl acrylate, ceryl acrylate, heptacosanyl acrylate, montanyl acrylate, nancosanyl acrylate, myricyl acrylate, dotriacontyl acrylate, geddyl acrylate, capryl methacrylate, capryl methacrylate, pelargonyl methacrylate, undecyl methacrylate, lauryl methacrylate, tridecyl methacrylate, myristyl methacrylate, pentadecyl methacrylate, cetyl methacrylate, palmitoleyl methacrylate, heptadecyl methacrylate, stearyl methacrylate, isostearyl methacrylate, elaidyl methacrylate, linoleyl methacrylate, elaidolinolenyl methacrylate, nondecyl methacrylate, arachidyl methacrylate, heneiscosyl methacrylate, behenyl methacrylate, erycyl methacrylate, lignoceryl methacrylate, ceryl methacrylate, heptacosanyl methacrylate, montanyl methacrylate, nancosanyl methacrylate, myricyl methacrylate, dotriacontyl methacrylate, and geddyl methacrylate. If a co-polymer is desired, mixtures of any two more such hydrophobic monomers may be employed. In some embodiments, the hydrophobic monomer is lauryl acrylate, stearyl acrylate, or a mixture of lauryl acrylate and stearyl acrylate.

In the process, the polymer of the hydrophobic monomer may be a homopolymer. Accordingly, in some embodiments, the hydrophobic monomer is exclusively any of the above hydrophobic monomers. In some embodiments, the polymer is a homopolymer of lauryl acrylate, or a homopolymer of stearyl acrylate.

In the process, the aqueous emulsion may be a microemulsion with micron-sized or sub-micron-sized emulsified particles of the polymer. In some embodiments the aqueous emulsion is a nanoemulsion. For example, the emulsified particles may have an average particle size of from about 1 nm to about 10 microns. In some embodiment, the emulsified particles have an average particle size of from about 10 nm to about 1 micron. In some embodiment, the emulsified particles have an average particle size of from about 10 nm to about 500 nm. In some embodiments, the emulsified particles have an average particle size of from about 25 nm to about 250 nm. In some embodiments, the emulsified particles have an average particle size of from about 50 nm to about 150 nm.

Grafting of the support resin to the homopolymer may also be conducted by reacting the resin with a glycidyl methacrylate. Accordingly, prior to addition of the hydrophobic monomer to the support resin, glycidyl methacrylate may be grafted to the support resin by simple addition of the monomer to the resin water solution at about 85° C. The GMA grafts to the resin through the epoxy group during the dispersion of the hydrophobic monomer and the polymerizes with it, causing the resin graft to the hydrophobic polymer.

The aqueous emulsions described above may be used in a wide variety of coatings. For example, it may be included in inks and paints. When applied to a substrate, the hydrophobic groups of the polymer may crystallize. As the hydrophobic groups on the substrate absorb heat and undergo a melt, they may store that heat. As the substrate cools, the hydrophobic groups undergo a crystallization, they may radiate that heat. Such properties may be useful in heat transfer, energy efficiency, and phase changing materials.

The present technology, thus generally described, will be understood more readily by reference to the following example, which is provided by way of illustration and is not intended to limit the present technology.

EXAMPLES

Example 1

The resin dispersion is made by dissolving a polymer composed of 36% styrene, 16% methyl methacrylate, 28% 2-ethylhexyl acrylate, 11% methacrylic acid, and 10% acrylic acid (404 g) in deionized water (577.6 g). The mixture is then stirred. Ammonia (18.4 g of 30% in water) is then added and the mixture is heated to 85° C. and held there until a uniform dispersion is obtained. The dispersion is 40% solids with a pH of 7.5-8.0.

Example 2

To the dispersion from Example 1 (179.4 g) is added deionized water (138.7 g), and the solution heated to 85° C. Lauryl glycidyl ether (Erysis GE-8 from CVC Chemicals; 4.1 g) and glycidyl methacrylate (2.4 g) are added to the dispersion solution and the mixture is held for 30 minutes. Ammonium hydroxide (28%; 3 g), 10% ammonium isoascorbic acid solution (15.7 g), and lauryl acrylate (LA; 161.5 g) were added and held at 50° C. for 60 minutes with stirring at 250 rpm. Copper sulfate solution (0.3%, 3 g) solution was then added followed by a feed of tert-butylhydroperoxide 70 (2.1 g; tBHP) in deionized water (60 g) over 60 minutes. The tBHP solution was then flushed twice with deionized water (3 g and 12 g). The resulting mixture was then held for 1 hour. The batch was then cooled and deionized water (12 g) was added.

Example 3

A 1 liter flask was charged with the dispersion of Example 1 (198.1 g) and deionized water (64 g), and the mixture was heated to 85° C. Lauryl glycidyl ether (4.6 g) and glycidyl methacrylate (2.4 g) were then added and held for 30 minutes. Stearyl acrylate (SA; 153.6 g), melted at 50° C., was then added followed by ammonium hydroxide (3.1 g) and deionized water (60 g). The resultant mixture was then held at 80° C. for 60 minutes at 250 rpm. After 30 minutes of the hold at 80° C., a 10% solution of ammonium ascorbic acid (15.7 g) was added. After the 60 minute hold was completed, a 0.3% solution of copper sulfate (3 g) was added. A solution of tBHP 70 (2.1 g) in deionized water (60 g) was added over 60 minutes and flushed with deionized water (3.4 g). The batch was then cooled.

Example 4

Following the process of Example 3, behenyl acrylate (BeA), melted at 60° C. was used instead of the stearyl acrylate.

Example 5

Deionized water (147.3 g) and the resin dispersion (161.1 g) from Example 1 were combined in a flask and heated to 85° C. Lauryl glycidyl ether (7.4 g) was the added and mixture held for 90 minutes. The temperature was set at 80° C. Ammonium hydroxide (2.1 g), a 10% solution of ammonium ascorbate (15.7 g), lauryl acrylate (84 g), and melted behenyl acrylate (84 g) were then added. The mixture was then stirred at 250 rpm for 60 minutes. Copper sulfate (0.3%; 3 g) was then added and a feed of tBHP 70 (2.1 g) in deionized water (60 g) was added over 60 minutes. A flush of deionized waster (3.4 g) was then used and the mixture held for 30 minutes prior to cooling.

Example 6

Melting points and minimum film formation temperatures (MFFT; Table 1) were recorded.

TABLE 1

Minimum film formation temperatures.

| Latex | Monomer | Melt point (° C.) | MFFT (° C.) |
|---|---|---|---|
| Ex 2 | 100% LA | 5 | <0 |
| Ex 3 | 100% SA | 48 | 39 |
| Ex 4 | 100% BeA | 53 | 43 |
| Ex 5 | 50/50 LA/BeA | 30 | 5 |

Para. A. A composition comprising an aqueous emulsion of a support resin and a polymer of a hydrophobic monomer, with the proviso that the composition is surfactant-free; wherein the support resin is a styrene-acrylic resin or acrylic resin having from about 5 wt % to about 40 wt % acid functional repeat units.

Para. B. The composition of Para. A, wherein the hydrophobic monomer comprises a $C_4$-$C_{40}$ alkylacrylate, a $C_4$-$C_{40}$ alkylmethacrylate, a $C_4$-$C_{40}$ alkenylacrylate, or a $C_4$-$C_{40}$ alkenylmethacrylate.

Para. C. The composition of any one of Paras. A or B, wherein the hydrophobic monomer comprises a $C_8$-$C_{34}$ alkylacrylate, a $C_8$-$C_{34}$ alkylmethacrylate, a $C_8$-$C_{40}$ alkenylacrylate, or a $C_8$-$C_{40}$ alkenylmethacrylate.

Para. D. The composition of any one of Paras. A-C, wherein the hydrophobic monomer comprises capryl acrylate, capryl acrylate, pelargonyl acrylate, undecyl acrylate, lauryl acrylate, tridecyl acrylate, myristyl acrylate, pentadecyl acrylate, cetyl acrylate, palmitoleyl acrylate, heptadecyl acrylate, stearyl acrylate, isostearyl acrylate, elaidyl acrylate, linoleyl acrylate, elaidolinolenyl acrylate, nondecyl acrylate, arachidyl acrylate, heneiscosyl acrylate, behenyl acrylate, erycyl acrylate, lignoceryl acrylate, ceryl acrylate, heptacosanyl acrylate, montanyl acrylate, nancosanyl acrylate, myricyl acrylate, dotriacontyl acrylate, geddyl acrylate, capryl methacrylate, capryl methacrylate, pelargonyl methacrylate, undecyl methacrylate, lauryl methacrylate, tridecyl methacrylate, myristyl methacrylate, pentadecyl methacrylate, cetyl methacrylate, palmitoleyl methacrylate, heptadecyl methacrylate, stearyl methacrylate, isostearyl methacrylate, elaidyl methacrylate, linoleyl methacrylate, elaidolinolenyl methacrylate, nondecyl methacrylate, arachidyl methacrylate, heneiscosyl methacrylate, behenyl methacrylate, erycyl methacrylate, lignoceryl methacrylate, ceryl methacrylate, heptacosanyl methacrylate, montanyl methacrylate, nancosanyl methacrylate, myricyl methacrylate, dotriacontyl methacrylate, or geddyl methacrylate.

Para. E. The composition of any one of Paras. A-D, wherein the hydrophobic monomer comprises lauryl acrylate, stearyl acrylate, behenyl acrylate, or a mixture of any two or more thereof.

Para. F. The composition of any one of Paras. A-E, wherein the aqueous emulsion is a nanoemulsion having an average particle size of from about 10 nm to about 500 nm.

Para. G. The composition of any one of Paras. A-F, wherein the aqueous emulsion is a nanoemulsion having an average particle size of from about 50 nm to about 150 nm.

Para. H. The composition of any one of Paras. A-G, wherein the support resin comprises a styrene-acrylic resin.

Para. I. The composition of any one of Paras. A-H, wherein support resin comprises an acrylic resin.

Para. J. The composition of any one of Paras. A-I, wherein the support resin has a weight average molecular weight from about 5,000 g/mol to about 20,000 g/mol.

Para. K. The composition of any one of Paras. A-J, wherein the support resin comprises support resin hydrophobic groups.

Para. L. The composition of any one of Paras. A-K, wherein the support resin hydrophobic groups of the support resin are present from about 1 wt % to about 15 wt %.

Para. M. The composition of any one of Paras. A-L, wherein the support resin hydrophobic groups of the support resin are present from about 1 wt % to about 5 wt %.

Para. N. The composition of any one of Paras. A-M, wherein the hydrophobic groups are imparted by a hydrophobic monomer in the support resin, or wherein the support resin has been post-modified with a hydrophobic monomer.

Para. O. The composition of any one of Paras. A-N, wherein the support resin comprises stearyl acrylate, lauryl acrylate, or behenyl acrylate.

Para. P. The composition of any one of Paras. A-O, wherein the support resin is a post-modified styrene-acrylate or acrylate resin that has been post-modified with lauryl glycidyl ether, stearyl glycidyl ether, or a mixture thereof.

Para. Q. A process comprising polymerizing in a reactor a hydrophobic monomer in aqueous media, in the presence of a support resin, without the presence of a surfactant, to form a nanoemulsion of a polymer of the hydrophobic monomer, wherein the support resin is a styrene-acrylic resin or acrylic resin having from about 5 wt % to about 40 wt % acid functional repeat units.

Para. R. The process of Para. Q, wherein the polymerizing further comprises dispersing the support resin in water in the reactor, adding to the reactor the hydrophobic monomer, and sequentially adding to the reactor a reducing agent and an oxidizing agent.

Para. S. The process of Para. Q or R, wherein the adding the hydrophobic monomer comprises melting the hydrophobic monomer prior to adding to the reactor.

Para. T. The process of any one of Paras. Q-S, wherein the hydrophobic monomer comprises a $C_4$-$C_{40}$ alkylacrylate, a $C_4$-$C_{40}$ alkylmethacrylate, a $C_4$-$C_{40}$ alkenylacrylate, or a $C_4$-$C_{40}$ alkenylmethacrylate.

Para. U. The process of any one of Paras. Q-T, wherein the hydrophobic monomer comprises a $C_8$-$C_{34}$ alkylacrylate, a $C_8$-$C_{34}$ alkylmethacrylate, a $C_8$-$C_{40}$ alkenylacrylate, or a $C_8$-$C_{40}$ alkenylmethacrylate.

Para. V. The process of any one of Paras. Q-U, wherein the hydrophobic monomer comprises capryl acrylate, capryl acrylate, pelargonyl acrylate, undecyl acrylate, lauryl acrylate, tridecyl acrylate, myristyl acrylate, pentadecyl acrylate, cetyl acrylate, palmitoleyl acrylate, heptadecyl acrylate, stearyl acrylate, isostearyl acrylate, elaidyl acrylate, linoleyl acrylate, elaidolinolenyl acrylate, nondecyl acrylate, arachidyl acrylate, heneiscosyl acrylate, behenyl acrylate, erycyl acrylate, lignoceryl acrylate, ceryl acrylate, heptacosanyl acrylate, montanyl acrylate, nancosanyl acrylate, myricyl acrylate, dotriacontyl acrylate, geddyl acrylate, capryl methacrylate, capryl methacrylate, pelargonyl methacrylate, undecyl methacrylate, lauryl methacrylate, tridecyl methacrylate, myristyl methacrylate, pentadecyl methacrylate, cetyl methacrylate, palmitoleyl methacrylate, heptadecyl methacrylate, stearyl methacrylate, isostearyl methacrylate, elaidyl methacrylate, linoleyl methacrylate, elaidolinolenyl methacrylate, nondecyl methacrylate, arachidyl methacrylate, heneiscosyl methacrylate, behenyl methacrylate, erycyl methacrylate, lignoceryl methacrylate, ceryl methacrylate, heptacosanyl methacrylate, montanyl methacrylate, nancosanyl methacrylate, myricyl methacrylate, dotriacontyl methacrylate, or geddyl methacrylate.

Para. W. The process of any one of Paras. Q-V, wherein the hydrophobic monomer comprises lauryl acrylate, stearyl acrylate, behenyl acrylate, or a mixture of any two or more thereof.

Para. X. The process of any one of Paras. Q-W, wherein the nanoemulsion has an average particle size of from about 10 nm to about 500 nm.

Para. Y. The process of any one of Paras. Q-X, wherein the nanoemulsion has an average particle size of from about 50 nm to about 150 nm.

Para. Z. The process of any one of Paras. Q-Y, wherein the support resin comprises a styrene-acrylic resin.

Para. AA. The process of any one of Paras. Q-Z, wherein support resin comprises an acrylic resin.

Para. BB. The process of any one of Paras. Q-AA, wherein the support resin has a weight average molecular weight from about 5,000 g/mol to about 20,000 g/mol.

Para. CC. The process of any one of Paras. Q-BB, wherein the support resin comprises support resin hydrophobic groups.

Para. DD. The process of any one of Paras. Q-CC, wherein the hydrophobic groups are imparted by a support resin hydrophobic monomer in the support resin, or wherein the support resin has been post-modified with a support resin hydrophobic monomer.

Para. EE. The process of any one of Paras. Q-DD, wherein the support resin comprises stearyl acrylate, lauryl acrylate, or behenyl acrylate.

Para. FF. The process of any one of Paras. Q-EE, wherein the support resin is a post-modified styrene-acrylate or acrylate resin that has been post-modified with lauryl glycidyl ether, stearyl glycidyl ether, or a mixture thereof.

Para. GG. The process of any one of Paras. Q-FF, wherein the support resin hydrophobic groups of the support resin are present from about 1 wt % to about 15 wt %.

Para. HH. The process of any one of Paras. Q-GG, wherein the support resin hydrophobic groups of the support resin are present from about 1 wt % to about 5 wt %.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While certain embodiments have been illustrated and described, it should be understood that changes and modifications can be made therein in accordance with ordinary skill in the art without departing from the technology in its broader aspects as defined in the following claims.

What is claimed is:

1. A composition comprising an aqueous emulsion of a support resin and a polymer of a hydrophobic monomer, with the proviso that the composition is surfactant-free; wherein:
the support resin is a styrene-acrylic resin or acrylic resin having from about 5 wt % to about 40 wt % acid functional repeat units; and
the polymer of the hydrophobic monomer consists of hydrophobic monomers selected from the group consisting of heneiscosyl acrylate, behenyl acrylate, lignoceryl acrylate, heptacosanyl acrylate, montanyl acrylate, nancosanyl acrylate, myricyl acrylate, dotriacontyl acrylate, geddyl acrylate, heneiscosyl methacrylate, behenyl methacrylate, lignoceryl methacrylate, heptacosanyl methacrylate, montanyl methacrylate, nancosanyl methacrylate, myricyl methacrylate, dotriacontyl methacrylate, geddyl methacrylate, and a combination of two or more thereof.

2. The composition of claim 1, wherein the polymer of the hydrophobic monomer consists of behenyl acrylate.

3. The composition of claim 1, wherein the aqueous emulsion is a nanoemulsion having an average particle size of from about 10 nm to about 500 nm.

4. The composition of claim 1, wherein the aqueous emulsion is a nanoemulsion having an average particle size of from about 50 nm to about 150 nm.

5. A composition comprising an aqueous emulsion of a support resin and a polymer of a hydrophobic monomer, with the proviso that the composition is surfactant-free; wherein:
the support resin is a styrene-acrylic resin or acrylic resin having from about 5 wt % to about 40 wt % acid functional repeat units;
the support resin has been post-modified with a support resin hydrophobic monomer; and
the polymer of the hydrophobic monomer consists of hydrophobic monomers selected from the group consisting of heneiscosyl acrylate, behenyl acrylate, lignoceryl acrylate, heptacosanyl acrylate, montanyl acrylate, nancosanyl acrylate, myricyl acrylate, dotriacontyl acrylate, geddyl acrylate, heneiscosyl methacrylate, behenyl methacrylate, lignoceryl methacrylate, heptacosanyl methacrylate, montanyl methacrylate, nancosanyl methacrylate, myricyl methacrylate, dotriacontyl methacrylate, geddyl methacrylate, and a combination of two or more thereof.

6. The composition of claim 5, wherein the support resin hydrophobic monomer is present from about 1 wt % to about 15 wt %.

7. The composition of claim 5, wherein the support resin hydrophobic monomer is selected from the group consisting of stearyl acrylate, lauryl acrylate, behenyl acrylate, and combinations of two or more thereof.

8. The composition of claim 5, wherein before the support resin has been post-modified with the support resin hydrophobic monomer, the support resin has been modified with lauryl glycidyl ether, stearyl glycidyl ether, or a mixture thereof.

9. A process for producing the composition of claim 1, the process comprising:
polymerizing in a reactor the hydrophobic monomers in aqueous media, in the presence of the support resin, without the presence of a surfactant, to form the aqueous emulsion of the support resin and the polymer of the hydrophobic monomer.

10. The process of claim 9, wherein the polymerizing further comprises dispersing the support resin in water in the reactor, adding to the reactor the hydrophobic monomer, and sequentially adding to the reactor a reducing agent and an oxidizing agent.

11. The process of claim 10, wherein the adding the hydrophobic monomer comprises melting the hydrophobic monomer prior to adding to the reactor.

12. The process of claim 9, wherein the hydrophobic monomer is behenyl acrylate.

13. The process of claim 9, wherein the aqueous emulsion is a nanoemulsion having an average particle size of from about 10 nm to about 500 nm.

14. The process of claim 9, wherein the support resin has been post-modified with a support resin hydrophobic monomer.

15. A composition comprising an aqueous emulsion of a post-modified support resin comprising a support resin and a homopolymer of a hydrophobic monomer, with the proviso that the composition is surfactant-free; wherein:
the support resin is a styrene-acrylic resin or acrylic resin having from about 5 wt % to about 40 wt % acid functional repeat units,
the support resin is post-modified with lauryl glycidyl ether, stearyl glycidyl ether, or a mixture thereof to provide a post-modified support resin, and the homopolymer of the hydrophobic monomer is grafted to the post-modified support resin; and
the homopolymer of the hydrophobic monomer consists of hydrophobic monomers selected from the group consisting of heneiscosyl acrylate, behenyl acrylate, lignoceryl acrylate, heptacosanyl acrylate, montanyl acrylate, nancosanyl acrylate, myricyl acrylate, dotriacontyl acrylate, geddyl acrylate, heneiscosyl methacrylate, behenyl methacrylate, lignoceryl methacrylate, heptacosanyl methacrylate, montanyl methacrylate, nancosanyl methacrylate, myricyl methacrylate, dotriacontyl methacrylate, and geddyl methacrylate.

16. The composition of claim 15, wherein the homopolymer of the hydrophobic monomer consists of behenyl acrylate.

17. A process for producing the composition of claim 15, the process comprising:
dispersing the support resin in an aqueous media;
modifying the support resin with lauryl glycidyl ether, stearyl glycidyl ether, or mixtures thereof to form the post-modified support resin; and
polymerizing the hydrophobic monomers to form the homopolymer of the hydrophobic monomers, without the presence of a surfactant, to form the aqueous emulsion of the post-modified support resin,
wherein the homopolymer is grafted to the post-modified support resin.

18. The process of claim 17, wherein the hydrophobic monomer is behenyl acrylate.

* * * * *